(12) United States Patent
von Gutfeld et al.

(10) Patent No.: US 6,284,087 B1
(45) Date of Patent: *Sep. 4, 2001

(54) METHOD AND SYSTEM FOR CURING AN ULTRA-VIOLET CURABLE SEALANT THAT IS SHADOWED BY METALLIZATION

(75) Inventors: Robert J. von Gutfeld, New York; James H. Glownia, Somers, both of NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/425,711

(22) Filed: Oct. 22, 1999

(51) Int. Cl.[7] ........................................ B32B 31/28
(52) U.S. Cl. .................. 156/275.5; 156/99; 156/275.7; 156/321; 156/322; 349/122; 349/190; 425/25
(58) Field of Search ........................ 156/99, 107, 151, 156/153, 272.2, 272.8, 273.3, 275.3, 275.5, 275.7, 321, 322; 349/122, 153, 190; 445/25

(56) References Cited

U.S. PATENT DOCUMENTS 4,523,102 * 6/1985 Kazufumi et al. ................ 156/275.5
6,179,679 * 1/2001 von Gutfeld et al. ................ 445/25

* cited by examiner

*Primary Examiner*—Jeff H. Aftergut
*Assistant Examiner*—Michael A. Tolin
(74) *Attorney, Agent, or Firm*—Ohlandt, Greeley, Ruggiero & Perle, LLP; Marian Underweiser Esq

(57) ABSTRACT

The invention is a method for curing a sealant used to affix two substrates to one another. The sealant requires curing by heat or uv photons. To overcome the shadowing caused by metal patterns, the uv light is directed in a path towards said sealant, and a light diffusion element is positioned in the optical path. The diffusion element causes a diffusion of the optical radiation so as to enable some of the diffused optical radiation to avoid the metallization features and to be incident on the sealant. If the sealant is of the dual cure type, the curing thereof is further aided by application of heat.

20 Claims, 5 Drawing Sheets

METHOD AND SYSTEM FOR CURING AN ULTRA-VIOLET CURABLE SEALANT THAT IS SHADOWED BY METALLIZATION

This application is related to a co-pending application of the inventors hereof, entitled "A Method and System for Curing an Ultra-Violet Curable Sealant That Is Shadowed by Metallization", Ser. No. 09/425,701, now U.S. Pat. No. 6,179,679.

FIELD OF THE INVENTION

The invention relates to an improved method for affixing two objects together with a light/heat curable sealant and, more particularly, to a method and system for curing such a sealant that is shadowed by metallization components.

BACKGROUND OF THE INVENTION

Flat computer display panels (see FIGS. 1a–1c) require attachment of two glass substrates 6 and 8. One substrate 6 contains an active device area 10 of thin film transistors (also referred to as TFT's) and accompanying circuitry. Second substrate 8 comprises a color filter 11. About the edges of color filter 11 there is a peripheral region 12 consisting of a layer of chrome oxide 14 over which there is deposited a layer of chrome 16. In some cases, peripheral region 12 consists of an organic resin. In both cases, these layers are referred to as black matrix 17.

A sealant 18 is applied just prior to attachment of substrates 6 and 8. Circuitized substrate 6 is placed over sealant 18 which results in a major fraction of sealant 18 spreading into the black matrix region. Curing of sealant 18 generally requires the use of uv light, in the range of 350–360 nm in wavelength (although certain sealants respond to different wavelengths, they are not generally used for flat display panels). The incident uv light stimulates certain initiators in sealant 18 that cause a reaction leading to cure or cross linking therein, resulting in a leak-tight seal.

However, there is a curing problem in parts of this sealant region where there is metallization 22. Metallization 22 comprises data and gate lines of the TFT substrate that extend out from the sealed region for connection to driving electronic circuitry. In metallized regions located above sealant 18, the uv light is shadowed and sealant 18 beneath the shadowing metallization tends to remain uncured.

Accordingly, it is an object of the invention to provide an improved method for affixing two objects together with a curable sealant.

It is a further object of the invention to provide a method and system for curing a sealant that is shadowed by metallization components.

SUMMARY OF THE INVENTION

The present invention applies to flat panel displays where the inherent problem is one of shadowing of a curable sealant. The shadowing is caused by opaque metallization on one of two substrates that comprise component parts of the display panel. The metallization prevents photons from reaching the region of sealant immediately underneath the metallized pattern. This invention overcomes the uncured sealant problem (also referred to as the shadowing effect) by redirecting an incident photon beam to reach the shadowed regions. In a first embodiment, a surface of the black matrix 17 is roughened to cause diffusion of the reflected incident light, thus enabling redirected photons to bring about a complete cure of the sealant, i.e., activation of initiators, leading to polymerization. Various methods are described to obtain the roughened black matrix 17.

Alternatively, the light beam may be intensity modulated and/or an additional heat source provided to cause heating in the region of the metallization. In this combined heating-photon method, a dual cure (i.e., light/heat) sealant will cure by either one or a combination of optical and thermal excitations to excite the curing initiators.

DETAILED DESCRIPTION OF THE INVENTION

The invention enables an incident uv beam (or more generically a light beam of any specified wavelength) to become divergent or multiply reflect within the two substrates that are being sealed to each other. This action maximizes the number of incident photons that can reach regions between the two substrates to be sealed that are shadowed from the incident beam.

Figure 1A:
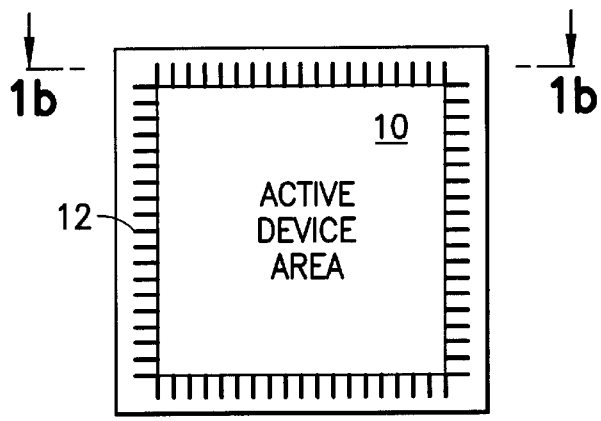
FIG. 1a is a plan view of a flat panel display.
Figure 1B:
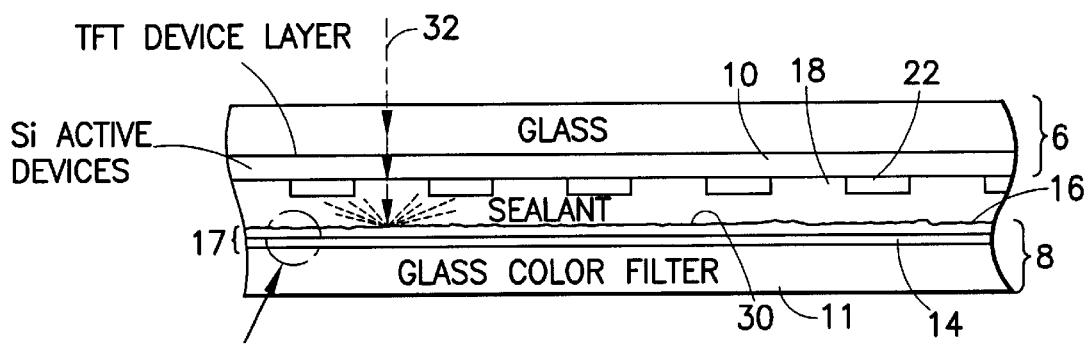
FIG. 1b is a sectional view of FIG. 1a, taken along line 1b—1b.
Figure 1C:
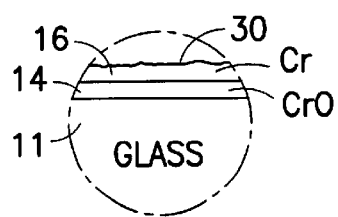
FIG. 1c shows an expanded view of the color filter substrate whose black matrix has been processed to give rise to diffuse reflection of incident radiation.

Typically, in present day liquid crystal displays (see FIGS. 1b and 1c), the region of glass color filter 11 that comes in contact with sealant 18 comprises a thin peripheral deposition layer or film of chrome oxide 14 followed by a layer of Cr 16. Alternatively, the peripheral layer may consist of an organic black matrix. For liquid crystal displays, uv light is generally used to activate sealant 18 to become polymerized.

The present invention processes surface 30 of peripheral black matrix 17 to roughen it from a mirror finish to a matte finish, either during deposition of the black matrix material or in a separate process after deposition. The matte finish causes any uv light 32 used during the curing process and incident in this region, to be diffusely reflected or scattered, rather than specularly reflected as is the case in present panel configurations. The scattered light from matte surface 30 is reflected into a sufficiently wide cone of angles to reach those regions of sealant 18 that are otherwise shadowed. With the matte finish, there is a large flux of photons created by the diffuse scattering of the uv to bring about a cure of sealant 18.

The relationship of the angular dependence of diffuse scattering to the incident wavelength and surface roughness is described in various optics references, e.g. Physical Optics, Chp. 1, pg 39, Third Ed., Optical Society of America, Washington, D.C. A more detailed description is also given in a paper by Settarova et al in Applied Solar Energy Vol. 31, pg 103 (1995).

In the uv wavelength of interest, up to 30 percent of the totally reflected light (or on the order of 10% from a roughened or matte surface) can be diffusely reflected. This affords a large flux of light available for scattering into regions otherwise shadowed by opaque patterns that prevent incident light from being transmitted. For example, the flux from a pulsed excimer XeF laser is on the order of 106 $W/cm^2$ or greater. For a chrome surface such as is found on black matrix 17, the specular reflection is on the order of 60%. For small angle scattering resulting from a diffuse scattering surface, the roughness can be engineered to provide a major fraction of this reflected light to enter into the shadowed region. For very diffuse scattering, the scattered portion may be reduced to only 2%, depending on the distance between the asperities or bumps of the roughened surface, for example, when the surface consists of $Ni/TiO_2$.

As another example, an efficient uniformly diffusing surface can be prepared from coatings of MgO reflecting as a very nearly perfect Lambert's Law radiator, i.e., the reflected light intensity is proportional to the cos j where the angle j is defined as the angle formed by the normal to the surface and the direction of the radiated ray of light (see R. S. Longhurst in Geometrical and Physical Optics, Chp 18, pg 448, Longman Group Limited (Hong Kong)).

For diffuse reflections and the system for attaining such reflections to be effective, it is desirable that (1) the sealant not be strongly absorbing and (2) that the photon source be robust. Measurements made on several uv sealants indicate only slight absorption. Measurements made using a pulsed XeF excimer laser show that, in general, there is a very high intensity of photons per pulse to promote curing of a variety of uv and uv-hybrid sealants (where hybrid means curable by either or both uv and elevated temperatures, also known as a dual sealant). The incident intensities (flux or power/area) used were on the order of $10^8$ times that of the usual uv lamps used in the panel industry for uv sealant curing. Accordingly, the roughened chrome surface in combination with a uv laser as the optical curing source will completely eliminate the shadow problem presently affecting the panel industry. Elimination of the shadowed area will mean a longer lifetime for a display panel as there will be no uncured sealant that can reach the liquid crystal, a common cause of long term panel failure.

There are many ways to bring about a roughening of the chrome surface. For example, slant angle deposition can result in columnar growth of the chrome at an angle that results in columns that are tilted away from the horizontal plane of the substrate. Alternatively, a mask can be used to diffract the chrome beam during deposition. Sand blasting can be used to roughen the surface to give asperities on the order of 10's of nm. Other techniques have been used in the laser industry to cause diffuse reflection of laser pump beams and are well known.

To help the photon curing, a dual sealant can be used so that heating may also occur during the application of the photon flux, particularly in those regions where there is optical absorption by metal patterns on the substrates. In other words, the intensity of the optical beam can be increased when incident on the metal pattern to enable a heating thereof, which added heat aids in the cure process. The thermal cure mechanism can be further enhanced by applying a bias temperature to the panel substrates so that an ambient temperature somewhat below the thermal cure temperature but well above ambient temperature is attained during substrate assembly. Typically an ambient temperature of 50 C.–70 C. can be used by way of a heating stage onto which the substrates are placed during assembly.

Alternatively, the substrates can be pre-heated to the aforementioned bias temperature and then brought to an assembly stage that also maintains this bias temperature.

In order to obtain diffuse scattering, a planar surface must be changed in a way that prevents the reflected waves from maintaining their phase relationship. In general, this is brought about by a form of roughening of the surface so that there are peaks and valleys or "asperities" that define the reflecting surface. The average vertical and horizontal spacing of the asperities is preferred to be on the order of a fraction of a wavelength of uv radiation (350 nm range).

Figure 2:
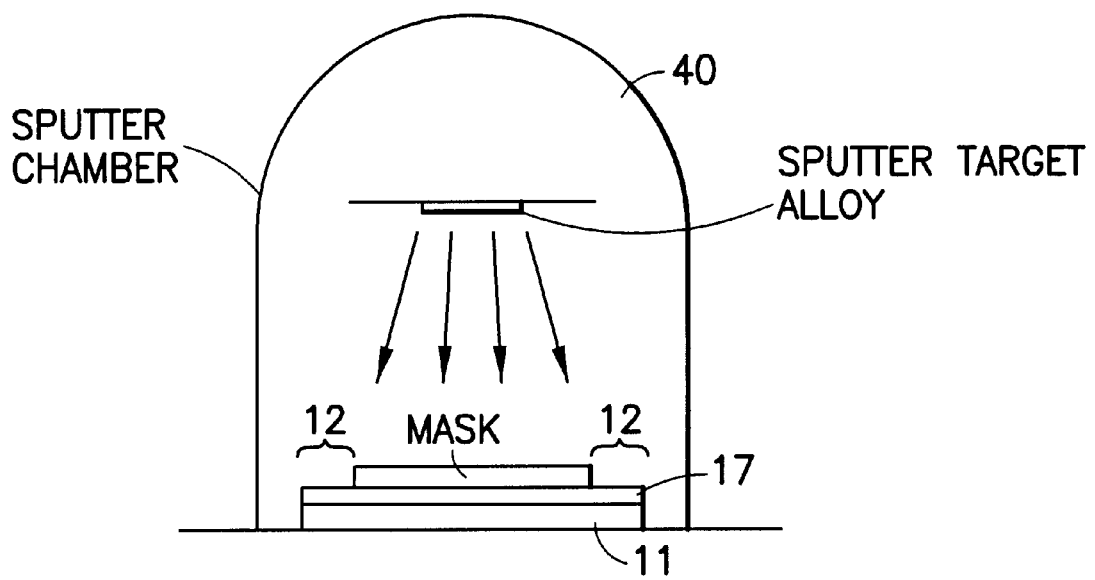
FIG. 2 is a schematic that shows a deposition method for obtaining a diffusely reflecting surface

FIG. 2 illustrates a method that uses a vacuum deposition chamber 40 into which color filter plate 11 is placed. Plate 11 has been masked photolithographically so that only its outer periphery 12 including black matrix 17 receives an evaporative layer that will be sufficiently coarse to give rise to diffuse reflections. Typically, the evaporant onto black matrix can be MgO (magnesium oxide) or $Ni/TiO_2$, among many other possible elements and compounds.

Figure 3:
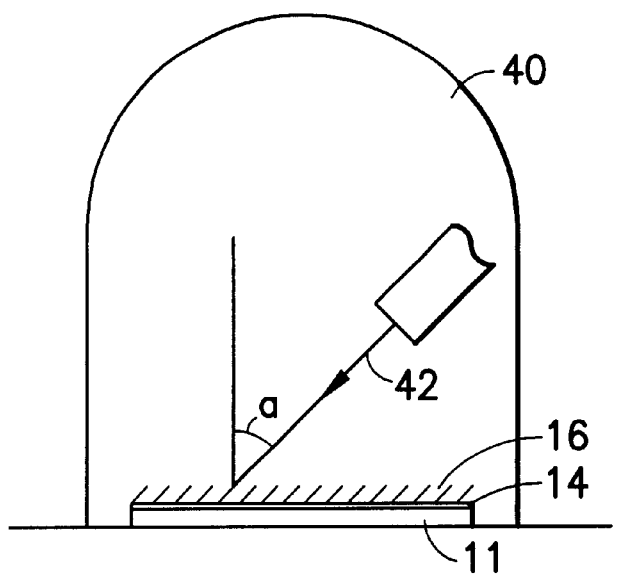
FIG. 3 shows deposition and growth of a metal film such as chrome when the angle of incidence of the vapor beam is not normal to the surface onto which the deposition is made. This gives rise to tilted columnar growth that reflects incident light at various angles.

FIG. 3 illustrates yet another method to create diffuse reflections from black matrix 17 by growing a reflective film that exhibits columnar growth in a direction out of the plane of the substrate. This type of growth is achieved by having the evaporant beam 42 at an angle "a" greater than zero with respect to the substrate normal. This type of slanted growth has been exhibited for many substances including $SiO_2$, Mo, Ti and other compounds and refractory metals that have relatively high Knoop hardness numbers. For example, a few hundred Angstroms of Mo evaporated at an angle of "a" equal between 30°–60° will cause the majority of reflections to be deflected from the substrate normal into the shadowed regions as shown.

Figure 4:
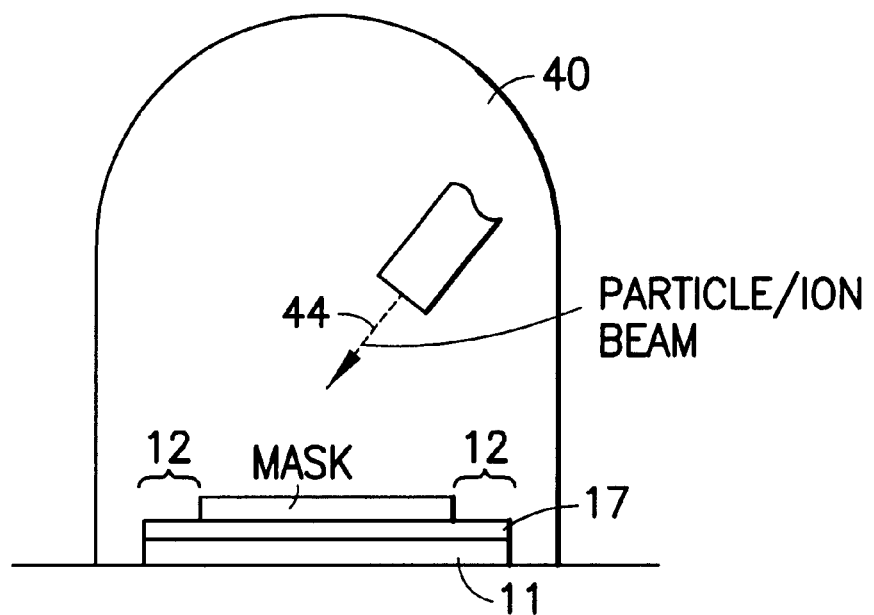
FIG. 4 shows the use of an ion beam to sputter some of the deposited black matrix material, leaving a roughened or matte surface finish.

A diffuse reflector can also result by starting with a smooth or specularly reflective surface and roughening it by means of an ion or particle beam. This is shown in FIG. 4. A neutralized ion beam 44 of argon, at the appropriate accelerating voltage, causes random sputtering of a predisposed film along periphery 12. Again, masking is preferably used to prevent the sputtered particles from landing and reforming as a deposit on the color filter.

Figure 5:
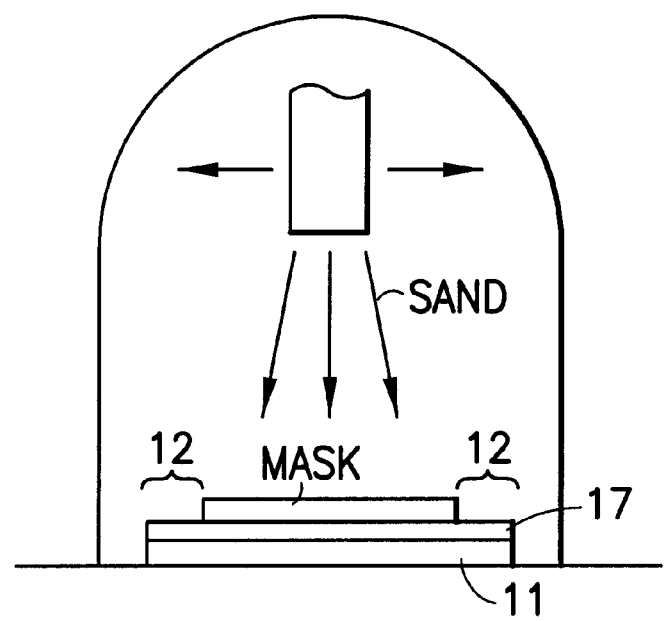
FIG. 5 makes use of sandblasting to obtain a matte finish of the black matrix.

A similar roughening of the surface can be formed by sandblasting a photolithographically masked area as shown in FIG. 5. Here, too masking is useful to avoid etching of any region other the intended one, i.e. the peripheral region in close proximity to the sealant.

Figure 6:
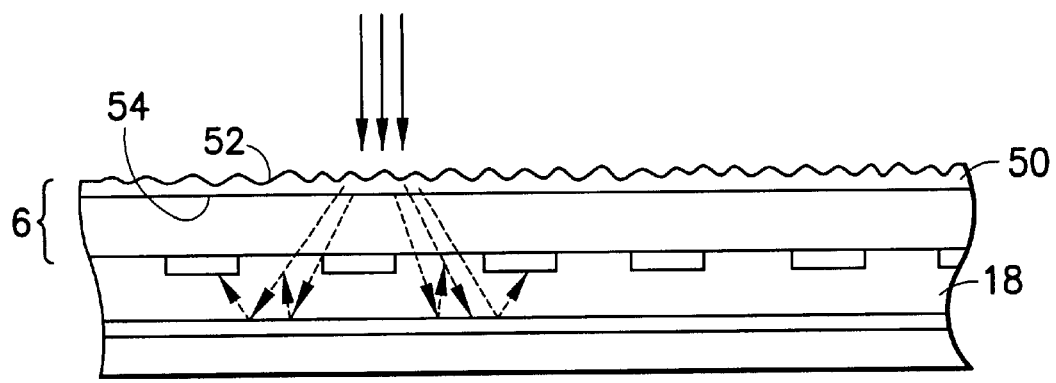
FIG. 6 shows a thin transparent plate with a matte finish or a diffuse optical transmitter placed on the top surface of the panel prior to irradiation to cause spreading or diffuse transmission of the incident uv beam. The plate can also be a hologram designed to spread the beam in an angular direction.

Two other methods may be used to provide incident beam diffusion that do not involve physical changes to the color filter. One is shown in FIG. 6 where a thin glass sheet 50 is placed over the region to be sealed. Glass sheet 50 has its upper face 52 prepared as a diffuse reflector while its lower surface 54 remains smooth. A couplant (not shown) such as water or stopcock grease may be used to swage or attach glass plate 50 to upper plate 6.

The couplant prevents reflections of the light at the thin glass-upper plate interface. However, while preferred, the couplant is not necessary if some scattering can be tolerated. The uv light that is used to cure the epoxy is now diffused by top surface 52 of glass plate 50 and is transmitted through the TFT substrate without reflection at the glass plate-substrate interface (due to the couplant material). Since this light is now diffuse, it will spread to regions otherwise shadowed by the metallization via both diffusion and reflection actions.

Figure 7:
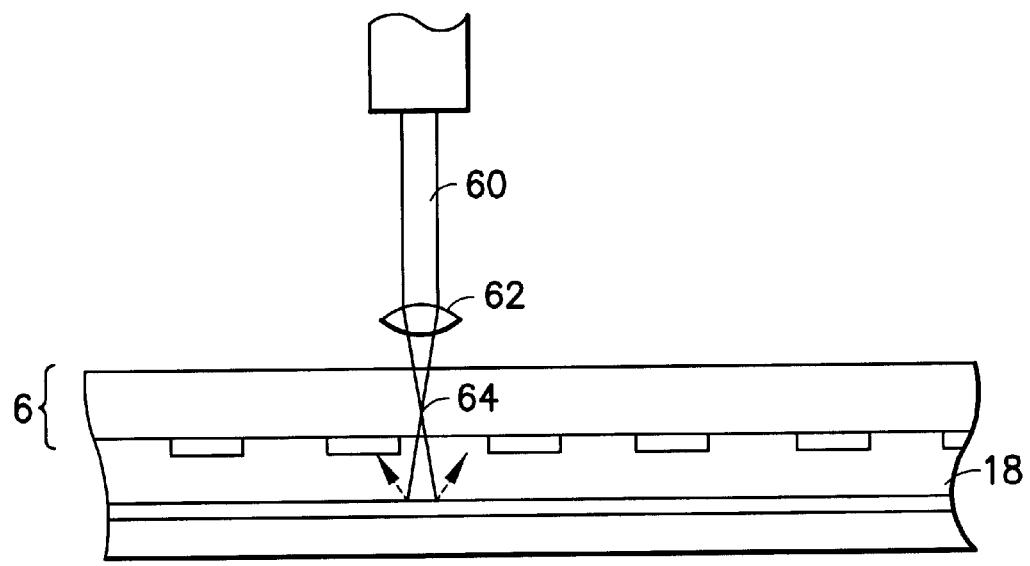
FIG. 7 depicts means for focusing the incident beam to cause beam spreading upon entrance into the upper panel, thereby providing a path, after reflection, for the incident light to penetrate into the otherwise shadowed region.
Figure 8:
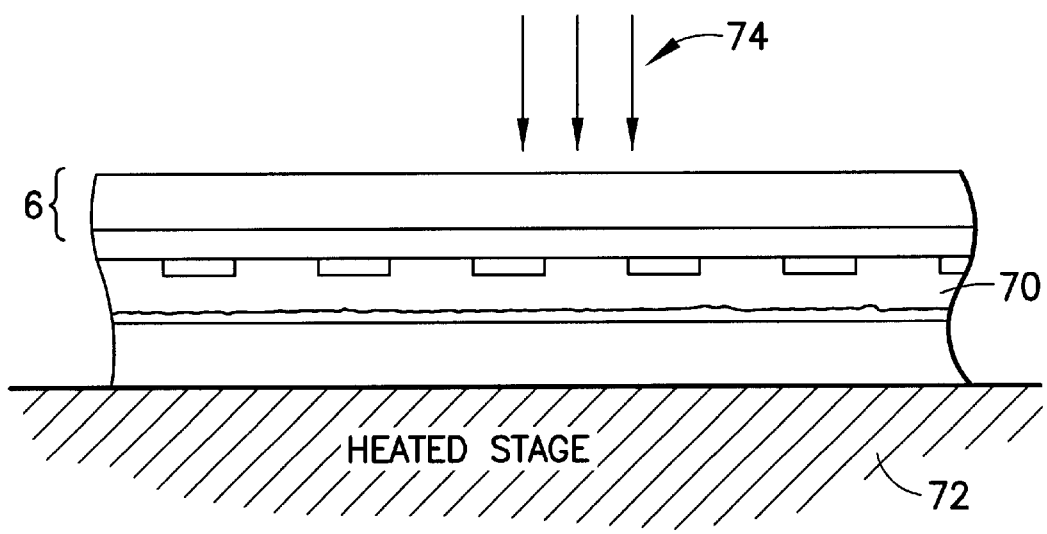
FIG. 8 shows the panel mounted on a thermal stage to provide a bias temperature close to the cure temperature when a dual sealant is used.

In FIG. 7 is shown a uv light beam 60 that is focused by lens 62 so that it diverges past focal point 64. The divergence effectively spreads the beam into a region that would otherwise be shielded from a parallel beam entering normal to the plate surface. Thus, the beam spread, adjusted by the use of an appropriate lens system, can be such that the sealant region shielded by the metallization receives radiation via both diffusion and reflection actions. FIG. 8 illustrates an embodiment where a dual sealant 70 is used, and the substrates to be joined are placed on a heated assembly bench 72. The applied heat creates a bias temperature which, combined with an incident optical beam 74, acts to cure the sealant. The system of FIG. 8 uses one of the diffuser mechanisms discussed above to assure incidence of the uv beam onto the sealant. It is preferred that the bias temperature be within a range from about 50 C. to about 70 C., or about 20 C. to about 30 C. below the cure temperature of the sealant, as the case may be.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for joining a first substrate to a second substrate, said first substrate being transparent to optical radiation and including opaque metallization features thereon, a curable sealant resident between said first substrate and said second substrate, portions of said sealant partially blocked from said optical radiation by said metallization features, said method comprising the steps of:
   a) directing said optical radiation in a path towards said sealant; and
   b) positioning a light diffusion element in said path to cause a diffusion of said optical radiation, whereby some of said optical radiation that is diffused is incident on and is reflected onto said sealant that is shadowed by the metallization features.

2. The method as recited in claim 1, wherein said light diffusion element comprises a roughened coating on said second substrate.

3. The method as recited in claim 2 wherein said roughened coating comprises a chrome oxide/chrome layer.

4. The method as recited in claim 2, wherein said roughened coating comprises a metallized layer upon which particles have been deposited.

5. The method as recited in claim 1, wherein said light diffusion element comprises a plate having a matte coating thereon and said positioning step places said plate on said first substrate.

6. The method as recited in claim 5, wherein a fluid coupling medium is resident between said plate and said first substrate.

7. The method as recited in claim 1, wherein said light diffusion element comprises a lens arrangement positioned between a source of said optical radiation and said first substrate.

8. The method as recited in claim 1, wherein said optical radiation is in the ultraviolet range.

9. The method as recited in claim 1, wherein said directing step is controlled to scan said optical radiation across regions where said sealant is resident and to increase energy of said optical radiation when said optical radiation is incident on said metallization features so as to create a heating thereof to aid in curing said sealant.

10. The method as recited in claim 1, wherein said light diffusion element is positioned between a source of said optical radiation and said second substrate.

11. A method for joining a first substrate to a second substrate to form a display panel, said first substrate being transparent to optical radiation and including opaque metallization features thereon, a dual-curable sealant resident between said first substrate and said second substrate, portions of said sealant partially blocked from said optical radiation by said metallization features, said dual curable sealant curable by application of heat and optical radiation, said method comprising the steps of:
   a) preheating said first substrate and second substrate to a bias temperature;
   b) directing said optical radiation in a path towards said sealant; and
   c) positioning a light diffusion element in said path to cause a diffusion of said optical radiation, whereby some of said optical radiation that is diffused and some that is reflected are incident on said sealant that is shadowed by the metallization features, whereby said bias temperature and said optical radiation combine to cause a cure of said dual-cure sealant.

12. The method as recited in claim 11, wherein said light diffusion element comprises a roughened coating on said second substrate.

13. The method as recited in claim 12 wherein said roughened coating comprises a chrome oxide/chrome layer.

14. The method as recited in claim 12, wherein said roughened coating comprises a metallized layer upon which particles have been deposited.

15. The method as recited in claim 11, wherein said light diffusion element comprises a plate having a matte coating thereon and said positioning step places said plate on said first substrate.

16. The method as recited in claim 15, wherein a fluid coupling medium is positioned between said plate and said first substrate.

17. The method as recited in claim 11, wherein said light diffusion element comprises a lens arrangement positioned between a source of said optical energy and said first substrate.

18. The method as recited in claim 11, wherein the bias temperature is within a range from about 50 C. to about 70 C.

19. The method as recited in claim 11, wherein the bias temperature is about 20 C. to about 30 C. below a cure temperature of said sealant.

20. The method as recited in claim 11, wherein said optical radiation is in the ultraviolet range.

* * * * *